(12) United States Patent
Nill

(10) Patent No.: US 12,123,451 B2
(45) Date of Patent: Oct. 22, 2024

(54) OFFSET ATTACHMENT DEVICE

(71) Applicant: LN1 INC., Southampton, NY (US)

(72) Inventor: Lance Nill, Southampton, NY (US)

(*) Notice: Subject to any disclaimer, the term of this patent is extended or adjusted under 35 U.S.C. 154(b) by 117 days.

(21) Appl. No.: 17/997,127

(22) PCT Filed: Jun. 27, 2021

(86) PCT No.: PCT/US2021/039286
§ 371 (c)(1),
(2) Date: Oct. 26, 2022

(87) PCT Pub. No.: WO2022/005922
PCT Pub. Date: Jan. 6, 2022

(65) Prior Publication Data
US 2023/0175544 A1 Jun. 8, 2023

Related U.S. Application Data

(60) Provisional application No. 62/705,503, filed on Jun. 30, 2020.

(51) Int. Cl.
*F16B 35/04* (2006.01)
*F16B 5/02* (2006.01)
*F16B 37/14* (2006.01)
*F16B 43/00* (2006.01)
*E06B 3/54* (2006.01)
*F16B 25/00* (2006.01)

(52) U.S. Cl.
CPC .......... *F16B 35/041* (2013.01); *F16B 5/0275* (2013.01); *F16B 37/145* (2013.01); *F16B 43/00* (2013.01); *E06B 3/5409* (2013.01); *F16B 25/0078* (2013.01); *F16B 35/04* (2013.01)

(58) Field of Classification Search
CPC .. F16B 5/0275; F16B 5/0283; F16B 15/0007; F16B 25/0078; F16B 35/041; F16B 37/145; F16B 43/00; F16B 35/04; E06B 3/5409
USPC .......................................... 411/337, 388–389
See application file for complete search history.

(56) References Cited

U.S. PATENT DOCUMENTS 3,004,784 A  10/1961 Selby
3,072,423 A  * 1/1963 Charlton ................... F16B 5/02
                                                        411/398
3,494,669 A  * 2/1970 Reppert .................... B60B 3/14
                                                        301/9.1
3,897,713 A  * 8/1975 Gugle ..................... F16B 25/10
                                                        416/213 A (Continued)

FOREIGN PATENT DOCUMENTS

GB      136372 A    12/1919

*Primary Examiner* — Roberta S Delisle
(74) *Attorney, Agent, or Firm* — LAW OFFICES OF MICHAEL L. WISE, LLC

(57) ABSTRACT

An attachment device includes a flange, an upper shaft, and a lower shaft. The flange defines an upper surface and lower surface. The upper shaft projects from the upper surface and is centered about an upper longitudinal axis. The lower shaft projects from the lower surface and is centered about a lower longitudinal axis. The upper longitudinal axis is not collinear with the lower longitudinal axis. So configured, the attachment device allows two objects to be attached to each other with a lateral offset equal to the lateral offset between the upper shaft and the lower shaft.

21 Claims, 13 Drawing Sheets

(56) References Cited

U.S. PATENT DOCUMENTS

| | | | | |
|---|---|---|---|---|
| 4,157,674 | A | * | 6/1979 | Carlson ............... F16B 25/0057 411/389 |
| 4,223,585 | A | * | 9/1980 | Barth .................. F16B 35/065 411/389 |
| 4,304,503 | A | * | 12/1981 | Gehring ................ F16B 35/04 29/525.04 |
| 4,334,815 | A | * | 6/1982 | Knohl .................. F16B 35/007 411/389 |
| 8,641,343 | B2 | * | 2/2014 | Mitrovic ............... F16B 37/122 411/338 |
| 10,309,435 | B2 | * | 6/2019 | Couto Maquieira ... F16B 5/025 |
| 2005/0129484 | A1 | * | 6/2005 | Huang .................. F16B 25/00 411/389 |
| 2007/0053766 | A1 | * | 3/2007 | Lin ...................... F16B 39/282 411/389 |
| 2007/0177959 | A1 | * | 8/2007 | Chopp .................. F16B 5/0275 411/389 |
| 2008/0310933 | A1 | * | 12/2008 | Ricciardo .............. F16B 39/10 411/389 |
| 2010/0061825 | A1 | * | 3/2010 | Liu ....................... B25B 13/08 411/493 |
| 2014/0169912 | A1 | * | 6/2014 | Sutterluetti ........... F16B 35/041 411/389 |

* cited by examiner

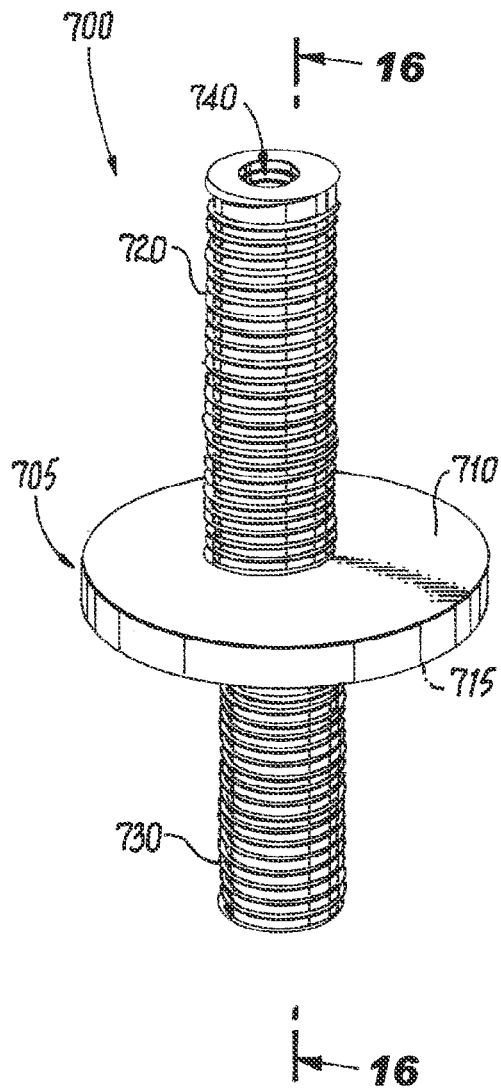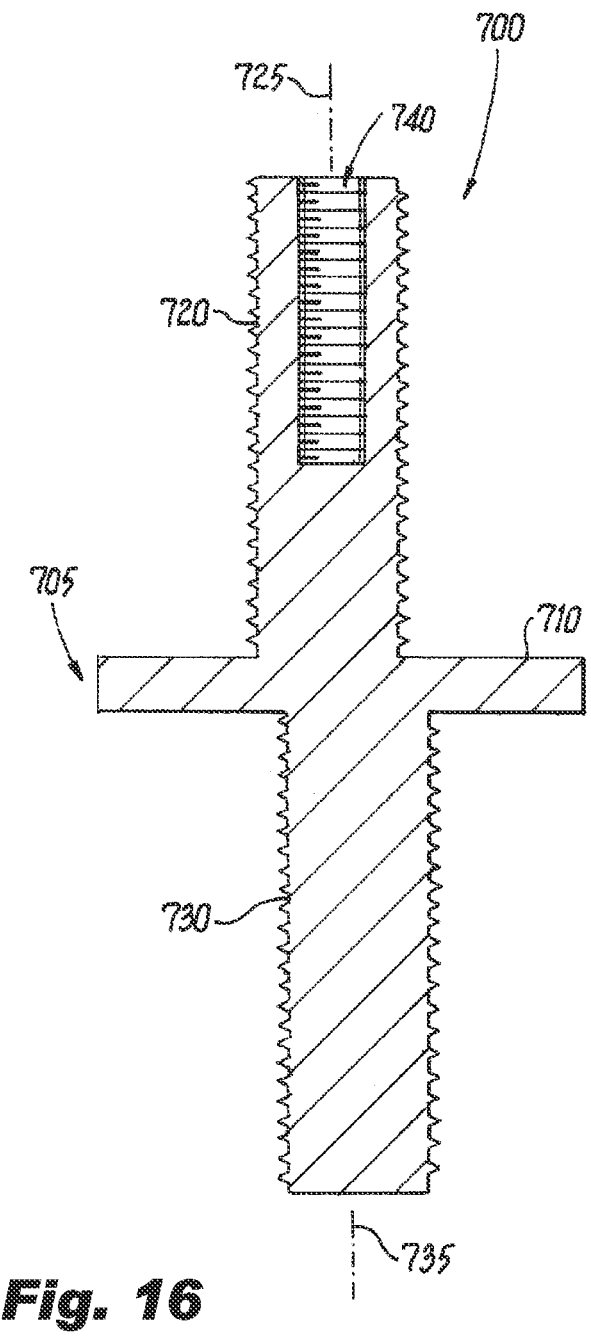
Fig. 15
Fig. 16

OFFSET ATTACHMENT DEVICE

FIELD OF THE INVENTION

The present invention relates generally to mechanical fasteners, and, more particularly, to attachment devices that utilize shafts to provide fixation.

BACKGROUND OF THE INVENTION

A bolt is a mechanical fastener with a threaded shaft and a head at one end. Bolts are closely related to screws and studs, which are also mechanical fasteners with threaded shafts. These types of threaded fasteners are typically inserted through two objects with aligned holes in order to fixate one object to the other. The holes of the two objects may be smooth or internally threaded. If internally threaded, the bolt may threadably engage with these internal threads to facilitate the fixation. Without the internal threads, the bolt may be made to engage with a separate nut.

Bolts rely on axial forces causing sufficient friction at the threads to remain in place. A torque is applied to the head to generate this axial force. The force acts between the bolt head and whatever the bolt is screwed into, whether that is a nut or one of the objects being fastened. This causes elongation of the bolt and forces one object against the other.

While threaded fasteners are ubiquitous, they require that two objects being fixated to one another have aligned holes. Nevertheless, it is commonplace at worksites to find objects that require fixation to be somewhat misaligned. Such misalignment can result from error or a failure to adhere to necessary tolerances. When facing such a situation, it may be necessary to modify the objects being fixated (e.g., by elongating or drilling new holes) or to disassemble a structure and start over while being more careful. Both solutions are far from ideal.

As a result, there is a need for attachment devices that address the above-described deficiencies.

SUMMARY OF THE INVENTION

Embodiments of the present invention address the above-identified needs by providing attachment devices that may be used to attach one object to another with an offset between the two objects that is defined by the attachment device.

In accordance with an aspect of the invention, an apparatus comprises a flange, an upper shaft, and a lower shaft. The flange defines an upper surface and a lower surface. The upper shaft projects from the upper surface and is centered about an upper longitudinal axis. The lower shaft projects from the lower surface and is centered about a lower longitudinal axis. The upper longitudinal axis is not collinear with the lower longitudinal axis.

BRIEF DESCRIPTION OF THE DRAWINGS

These and other features, aspects, and advantages of the present invention will become better understood with regard to the following description, appended claims, and accompanying drawings where:

FIGS. 15 and 16 show a perspective view and a sectional view, respectively, of a seventh attachment device in accordance with a seventh illustrative embodiment of the invention;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, the term "threaded fastener" encompasses any fastener defining a shaft that is at least partially externally threaded. The term therefore includes, but is not limited to, what are conventionally called bolts, screws, and studs. Moreover, when describing an attachment device having an upper shaft and a lower shaft, the upper shaft "vertically overlaps" the lower shaft when at least a portion of the upper shaft is vertically directly above at least a portion of the lower shaft with the upper shaft and the lower shaft oriented in a vertical direction. Lastly, when referencing a cylindrical object, the "lateral surface" of that object is the curved surface that connects the base and the top of the cylindrical object.

Figure 1:
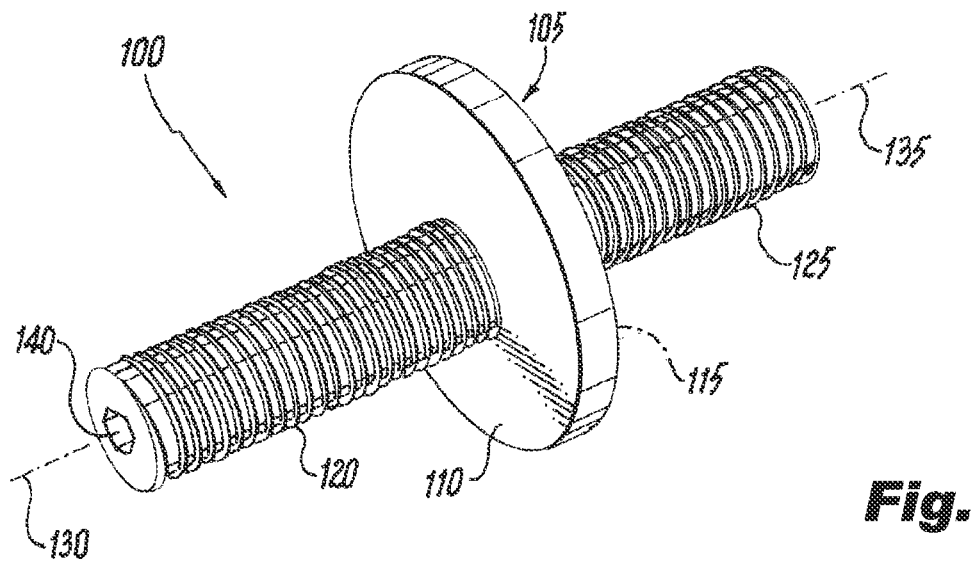
FIG. 1 shows a first attachment device in accordance with a first illustrative embodiment of the invention.

FIG. 1 shows a perspective view of a first attachment device 100 (i.e., an apparatus) in accordance with a first illustrative embodiment of the invention. The first attachment device 100 includes a flange 105 defining an upper surface 110 and a lower surface 115. An upper shaft 120 projects from the upper surface 110, while a lower shaft 125 projects from the lower surface 115. Both the upper shaft 120 and the lower shaft 125 are cylindrical and externally threaded.

The upper shaft 120 is centered around an upper longitudinal axis 130, while the lower shaft 125 is centered about a lower longitudinal axis 135. The upper longitudinal axis 130 is laterally offset from the lower longitudinal axis 135. That is, the upper longitudinal axis 130 is not collinear with the lower longitudinal axis 135. At the same time, the upper shaft 120 "vertically overlaps" the lower shaft 125 in the manner formally defined above. With the upper shaft 120 and lower shaft 125 oriented in a vertical direction, at least a portion of the upper shaft 120 is vertically directly above at least a portion of the lower shaft 125.

A socket 140 is built into the distal end of the upper shaft 120 opposite the flange 105. The socket 140 provides a means of gaining purchase on the first attachment device 100 with a drive tool in order to rotate the first attachment device 100 during installation. The socket 140 in the present illustrative embodiment is hexagonal to accommodate an Allen key drive, but this shape is merely by way of illustration and is not intended to be limiting. The socket 140 may take on a myriad of shapes to accommodate different drive types. The socket 140 may, for example, be replaced by a straight or cruciform slot to allow use of a flat-head or Phillips-head screwdriver when installing the first attachment device 100.

The socket 140 is centered in the upper shaft 120 of the first attachment device 100. However, with the socket 140 centered in the upper shaft 120, the socket 140 is necessarily off-center with respect to the lower shaft 125. This may cause the drive tool to wobble when the first attachment device 100 is rotated while engaging the lower shaft 125 with an object. To mitigate this wobble, the socket 140 may instead be placed off-center in the upper shaft 120 to be better centered with respect to the lower shaft 125. This assumes, of course, that the upper shaft 120 and the lower shaft 125 vertically overlap each other enough to allow this placement.

In use, the first attachment device 100 may be used to fixate two objects together with a lateral offset between the objects that is defined by the first attachment device 100. That is, with one object fixated to the upper shaft 120 and the other object fixated to the lower shaft 125, the two objects effectively become attached to each other with a lateral offset equal to the lateral offset between the upper shaft 120 and the lower shaft 125. The first attachment device 100 may be attached to an object in at least three different ways. If the object comprises an unthreaded through-hole, the lower shaft 125 may be inserted through the unthreaded through-hole so that the flange 105 abuts the object. A nut, cap, or the like may then be made to threadably engage the threads on the lower shaft 125 and tightened against the object. Alternatively, if the object provides an internally-threaded hole having internal threads complementary to the external threads on the lower shaft 125, the lower shaft 125 may be made to threadably engage the internally-threaded hole to accomplish the fixation. In the latter case, the internally threaded hole may be a through-hole (i.e., a hole that passes all the way through the object) or a blind hole. If the threaded hole is a through-hole, a nut may be added to the lower shaft 125 to further fixate the object, creating the third means of fixation, which is a hybrid of the previous two methods. Similar methods may be used to attach another object to the upper shaft 120.

In this manner, the first attachment device 100 is able to attach two objects together with a lateral offset equal to the lateral offset between the upper shaft 120 and the lower shaft 125. A first object is attached to the upper shaft 120, and a second object is attached to the lower shaft 125. The upper shaft 120 passes through or into the first object, and the lower shaft 125 passes through or into the second object. The first attachment device 100 can thereby help to address misalignments between two objects resulting from error, failure to adhere to necessary tolerances, or even mistakes, which are commonplace when constructing complex structures such as buildings.

Figure 2:
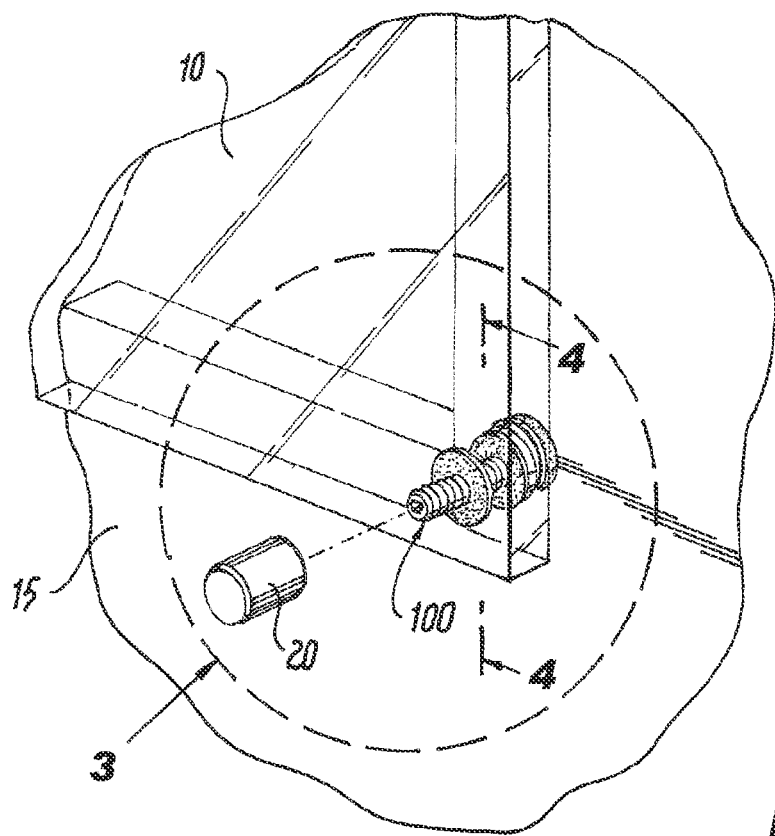
FIGS. 2-4 show a partially-exploded perspective view, a fully-exploded perspective view, and a sectional view, respectively, of an exemplary application involving the FIG. 1 attachment device.
Figure 3:
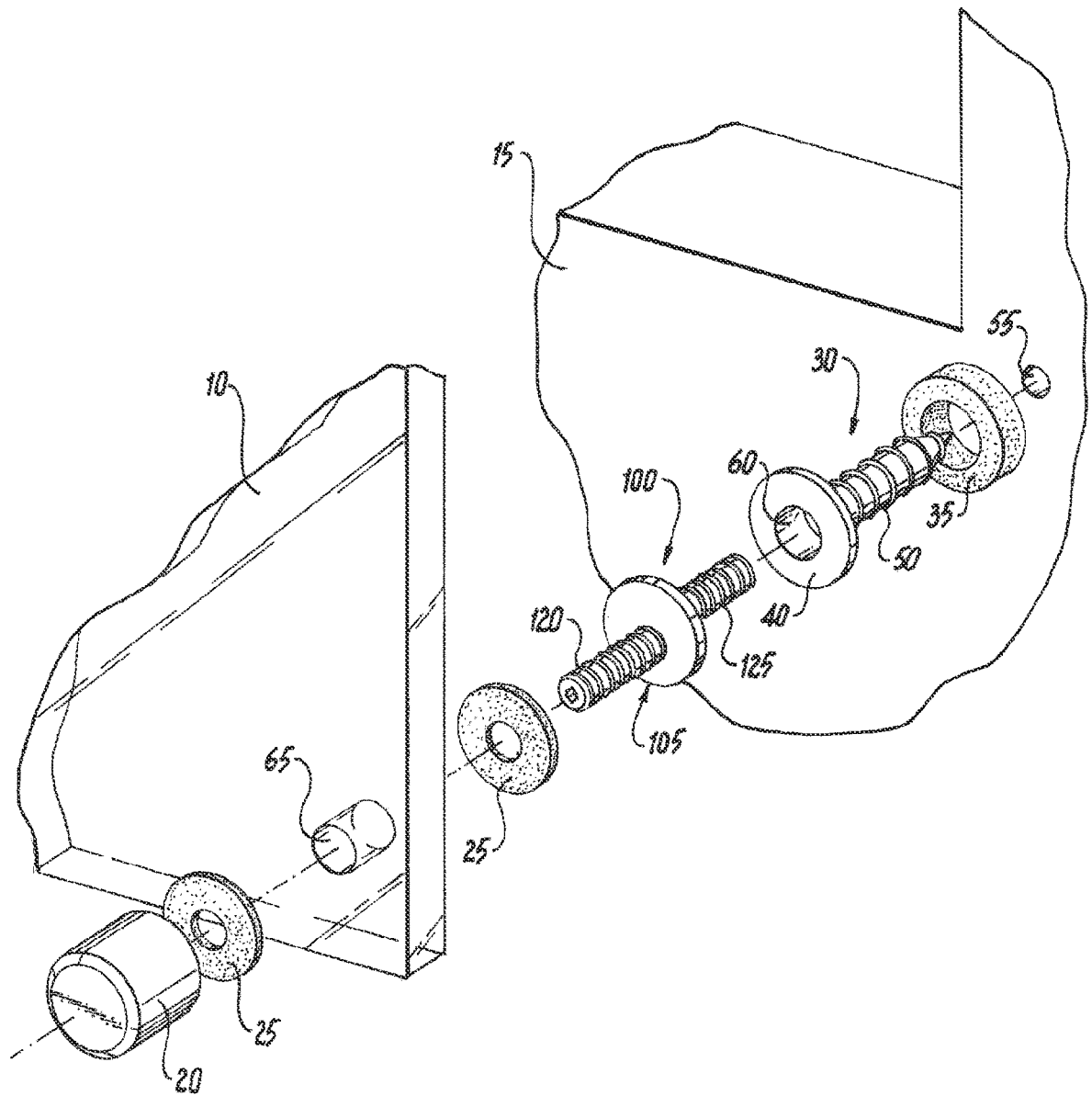
Figure 4:
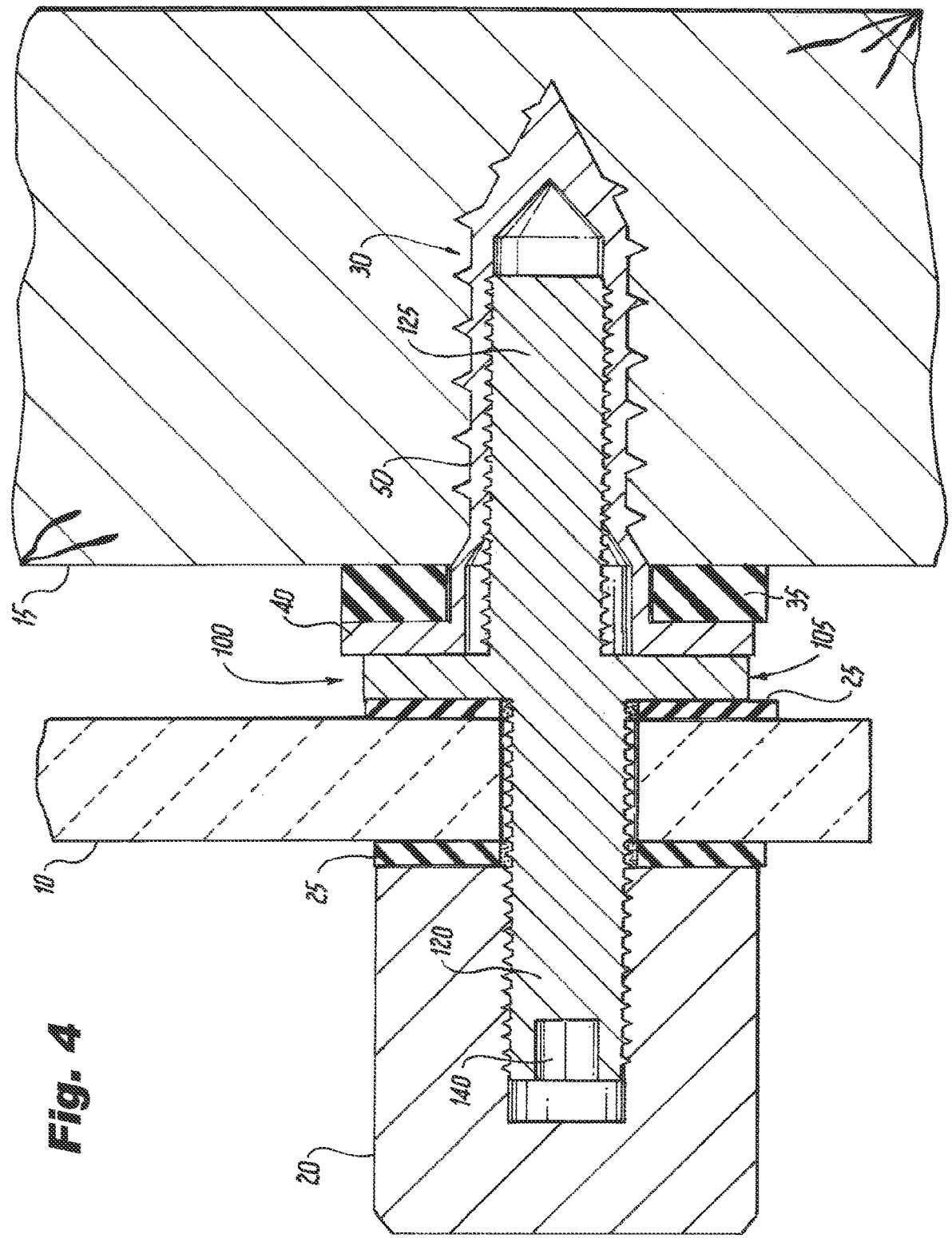

FIGS. 2-4 show an exemplary application wherein the first attachment device 100 is utilized to fixate a pane of glass 10 to a frame 15. FIG. 2 shows a partially-exploded perspective view of the exemplary application, while FIG. 3 shows a fully-exploded perspective view, and FIG. 4 shows a sectional view along the cleave plane indicated in FIG. 2. Other elements in the fixation include an internally-threaded end cap 20, two rubber washers 25, an insert 30, and an insert washer 35.

The insert 30 may take on various forms but includes an internally-threaded hole for receiving the lower shaft 125 and a means of attachment to the frame 15. Possible embodiments of the insert 30 include those described in, for example, International Publication Number WO2019/164843, which is hereby incorporated by reference herein. In the present illustrative embodiment, the insert 30 comprises a baseplate 40 with an externally-threaded post 50 depending therefrom. The externally-threaded post 50 tapers to a sharp tip to form a screw-like shape, which engages a receiving hole 55 in the frame 15 through the insert washer 35. An internally-threaded blind bore 60 extends from the baseplate 40 into the externally-threaded post 50.

To provide the desired fixation, the lower shaft 125 of the first attachment device 100 is disposed in and threadably engages the internally-threaded blind bore 60 of the insert 30. At the same time, the upper shaft 120 passes through the two rubber washers 25 and through a through-hole 65 in the pane of glass 10, where it is threadably engaged by the internally-threaded end cap 20.

The first attachment device 100 may have any number of dimensions and still fall within the scope of the invention. In one illustrative, non-limiting embodiment, for example, the flange 105 may have a diameter of 2.00 inches and each of the upper shaft 120 and the lower shaft 125 may have diameters of 0.250 inches. The flange 105 may have a thickness of 0.125 inches. The lateral offset between the center of the upper shaft 120 and the center of the lower shaft 125 may be 0.125 inches, making the offset correspond to one-eighth of an inch. Nevertheless, in providing these dimensions, it is again emphasized that these dimensions are merely by way of example and not intended to limit the scope of the invention.

It is preferred that, when forming the first attachment device 100, the upper shaft 120 vertically overlap the lower shaft 125. Such vertical overlap helps to maintain the strength of the first attachment device 100 by reducing twisting forces on the flange 105 that might be present if the upper shaft 120 were laterally farther displaced from the lower shaft 125. This preference is maintained for all embodiments of the invention set forth below.

The first attachment device 100 may be formed of various materials including, but not limited to, steel, brass, aluminum, and plastic. Once understood from the description provided herein, a person having ordinary skill in the relevant manufacturing arts would recognize how to manufacture the first attachment device 100 using conventional manufacturing techniques and tooling. The first attachment device 100 may, for example, be milled from a solid piece of material. Alternatively, the upper shaft 120 and the lower shaft 125 may be prepared separately from the flange 105 and then joined thereto using an attachment technique such as welding.

It should again be emphasized that the above-described embodiments of the invention are intended to be illustrative only. Other embodiments can use different types and arrangements of elements for implementing the described functionality or adding additional functionality. These numerous alternative embodiments will be apparent to one skilled in the art.

Figure 5:
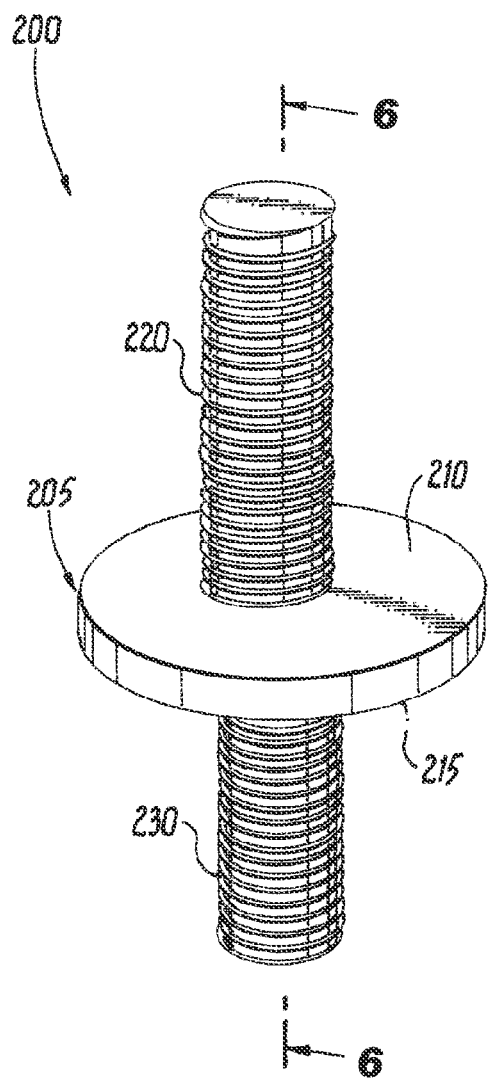
FIGS. 5 and 6 show a perspective view and a sectional view, respectively, of a second attachment device in accordance with a second illustrative embodiment of the invention.
Figure 6:
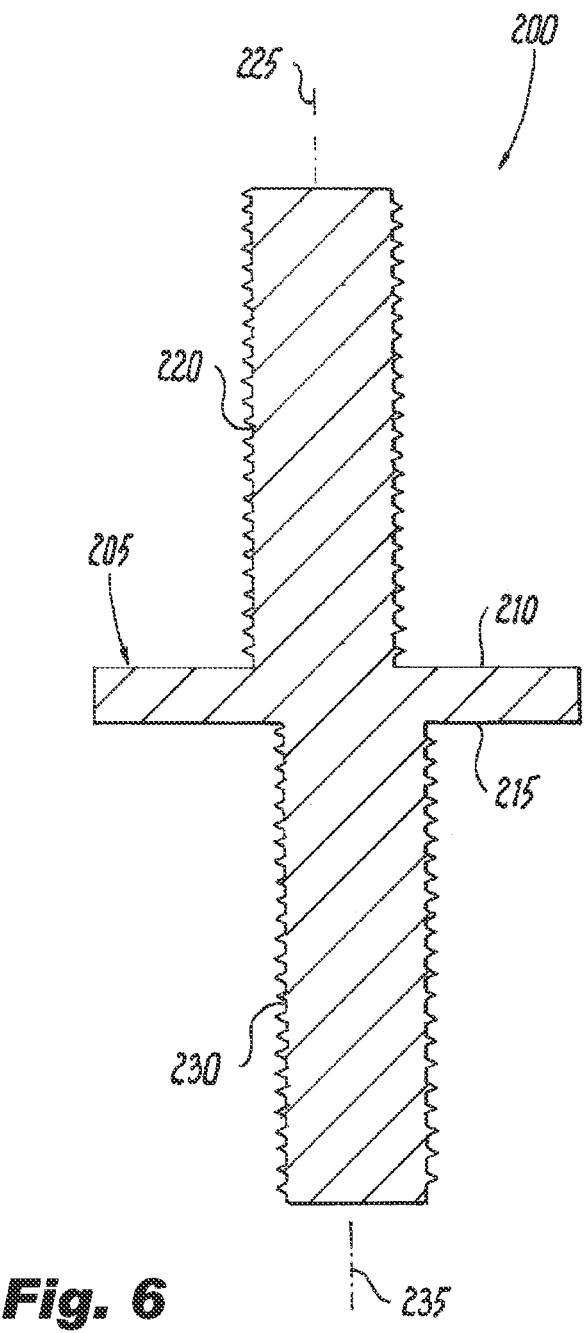

For example, FIGS. 5 and 6 show a perspective view and a sectional view, respectively, of a second attachment device 200 in accordance with a second illustrative embodiment of the invention. The second attachment device 200 includes a flange 205 defining an upper surface 210 and a lower surface 215. An upper shaft 220 projects upward from the upper surface 210 and is centered about an upper longitudinal axis 225, while a lower shaft 230 projects downward from the lower surface 215 and is centered about a lower longitudinal axis 235. The upper shaft 220 vertically overlaps the lower shaft 230, but the upper longitudinal axis 225 is not collinear with the lower longitudinal axis 235.

In the second attachment device 200, both the upper shaft 220 and the lower shaft 230 are cylindrical and externally threaded in a manner similar to the first attachment device 100. However, unlike the first attachment device 100, neither the upper shaft 220 nor the lower shaft 230 includes a socket or slot. Rather, they are solid throughout (i.e., the upper shaft 220 and the lower shaft 230 are devoid of sockets, slots, through-holes, and blind holes).

Figure 7:
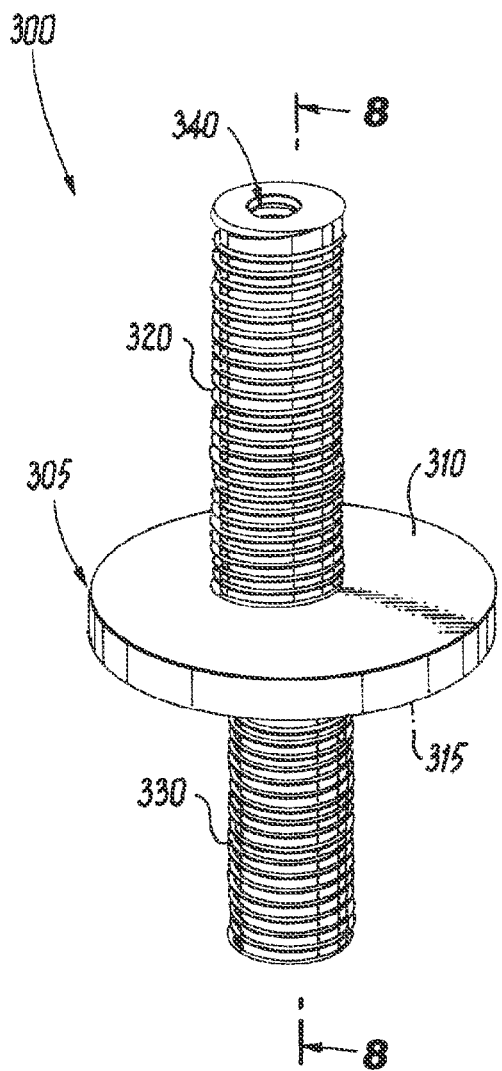
FIGS. 7 and 8 show a perspective view and a sectional view, respectively, of a third attachment device in accordance with a third illustrative embodiment of the invention.
Figure 8:
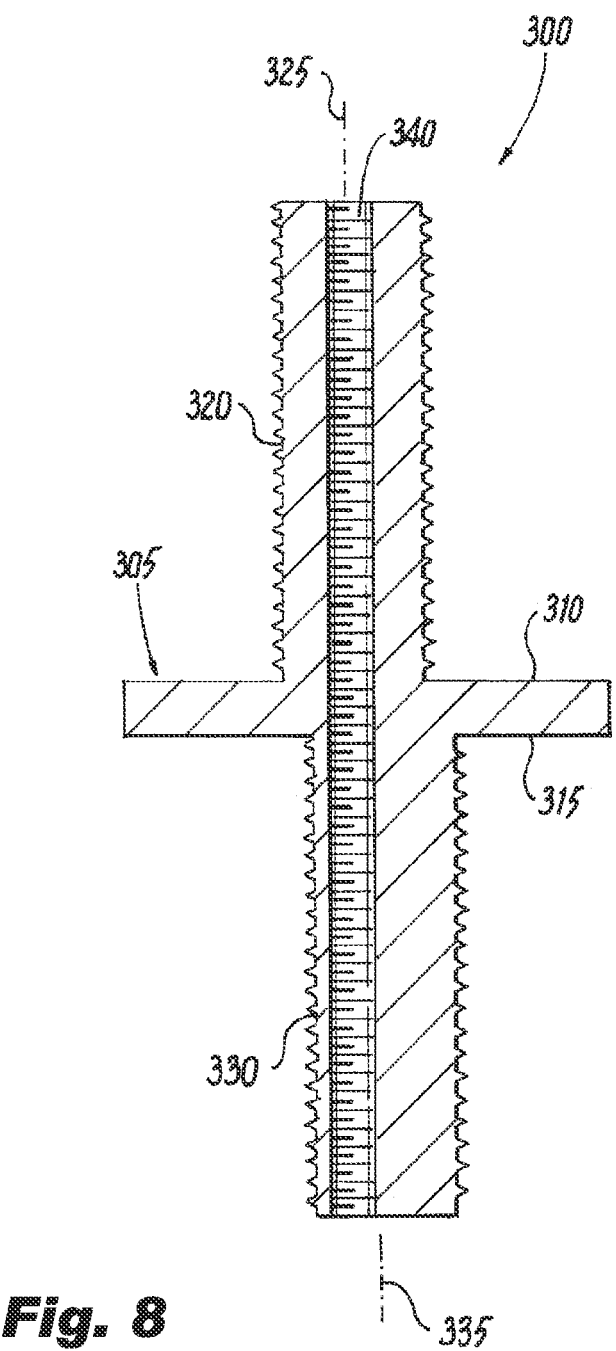

FIGS. 7 and 8 show a perspective view and a sectional view, respectively, of a third attachment device 300 in accordance with a third illustrative embodiment of the invention. The third attachment device 300 includes a flange 305 defining an upper surface 310 and a lower surface 315. An upper shaft 320 projects upward from the upper surface 310 and is centered about an upper longitudinal axis 325, while a lower shaft 330 projects downward from the lower surface 315 and is centered about a lower longitudinal axis 335. The upper shaft 320 vertically overlaps the lower shaft 330, but the upper longitudinal axis 325 is not collinear with the lower longitudinal axis 335.

In the third attachment device 300, both the upper shaft 320 and the lower shaft 330 are cylindrical, externally threaded, and have the same diameter. Nevertheless, unlike the first attachment device 100 and the second attachment device 200, the third attachment device 300 includes a through-hole 340, which passes longitudinally through the upper shaft 320, the flange 305, and the lower shaft 330. The through-hole 340 is linear, internally threaded, and is centered in the upper shaft 320 and off-center in the lower shaft 330 because of the lateral offset between the upper shaft 320 and the lower shaft 330. The through-hole 340 acts as an alternative means for attaching objects to the third attachment device 300. A threaded fastener, for example, may be made to threadably engage with the through-hole 340 to attach an object to the third attachment device 300. In fact, a single threaded fastener may be made to pass all the way through the upper shaft 320, the flange 305, and the lower shaft 330 if so desired.

Figure 9:
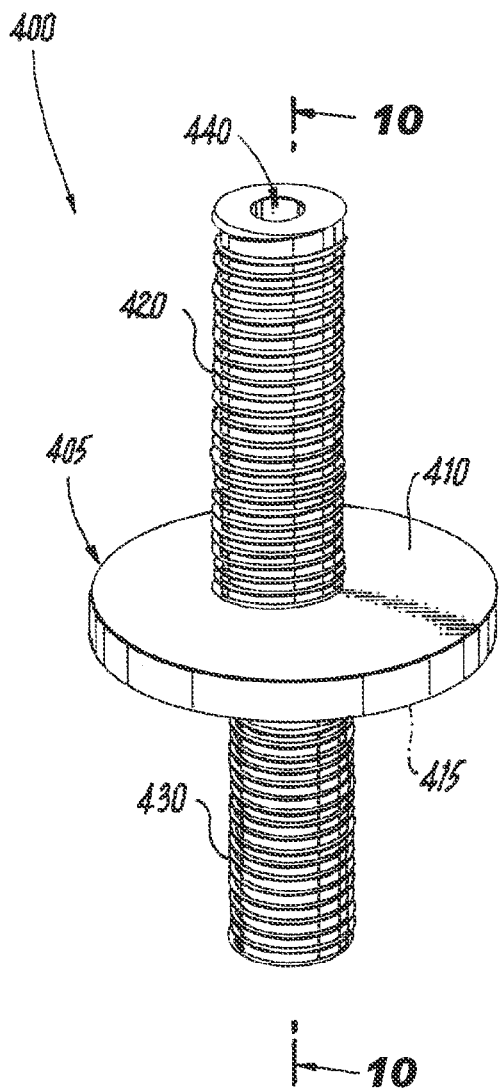
FIGS. 9 and 10 show a perspective view and a sectional view, respectively, of a fourth attachment device in accordance with a fourth illustrative embodiment of the invention.
Figure 10:
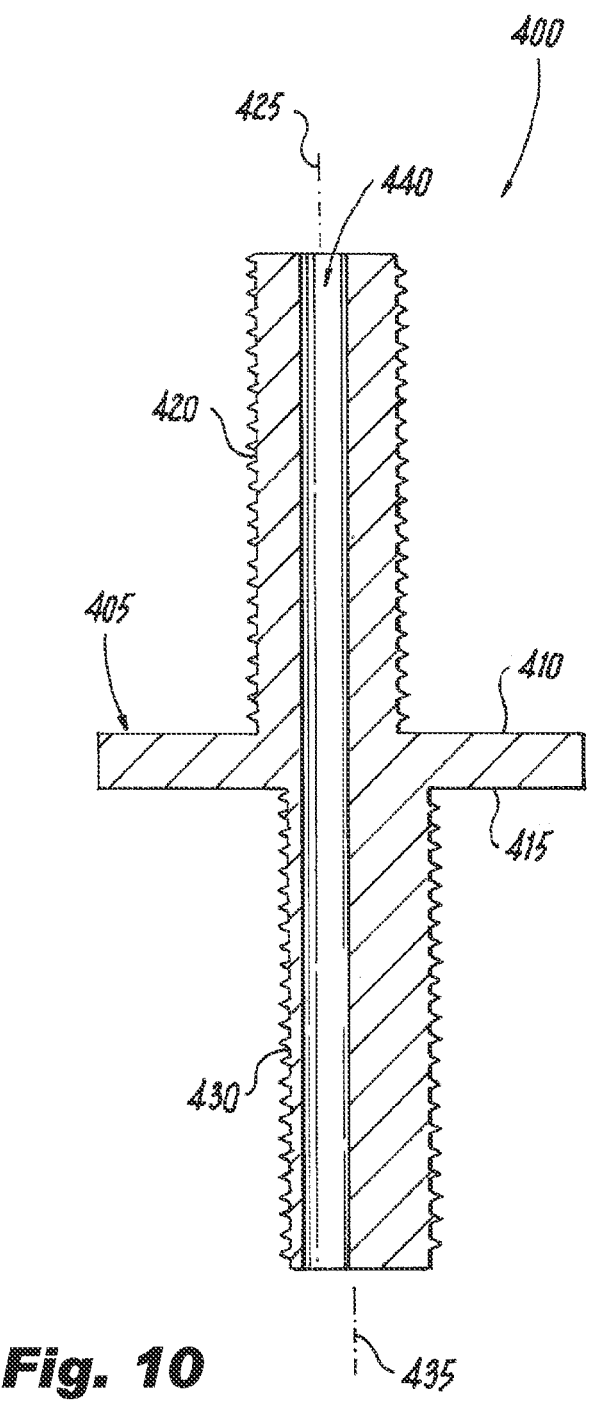

FIGS. 9 and 10 show a perspective view and a sectional view, respectively, of a fourth attachment device 400 in accordance with a fourth illustrative embodiment of the invention. The fourth attachment device 400 includes a flange 405 defining an upper surface 410 and a lower surface 415. An upper shaft 420 projects upward from the upper surface 410 and is centered about an upper longitudinal axis 425, while a lower shaft 430 projects downward from the lower surface 415 and is centered about a lower longitudinal axis 435. The upper shaft 420 vertically overlaps the lower shaft 430, but the upper longitudinal axis 425 is not collinear with the lower longitudinal axis 435.

In the fourth attachment device 400, the upper shaft 420 and the lower shaft 430 are both cylindrical, externally threaded, and have the same diameter. A smooth-bored through-hole 440 is linear along its entirety and passes longitudinally through the upper shaft 420, the flange 405, and the lower shaft 125. Again, the smooth-bored through-hole 440 is centered in the upper shaft 420 and is off-center in the lower shaft 430. The smooth-bored through-hole 440 may act as a means for passing gases, fluids, or solids through the fourth attachment device 400. In one or more applications, for example, a wire or wires (i.e., solids) may be made to pass through the smooth-bored through-hole 440.

Figure 11:
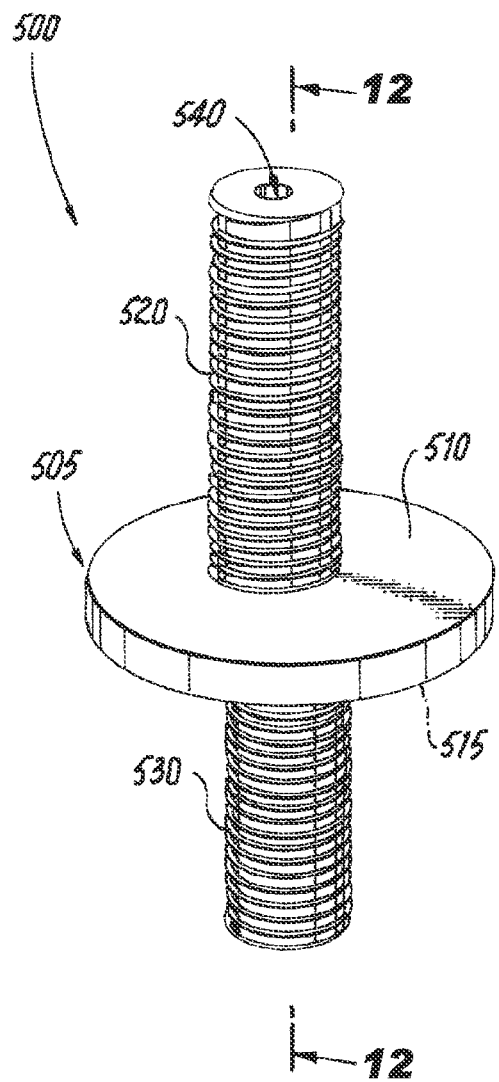
FIGS. 11 and 12 show a perspective view and a sectional view, respectively, of a fifth attachment device in accordance with a fifth illustrative embodiment of the invention.
Figure 12:
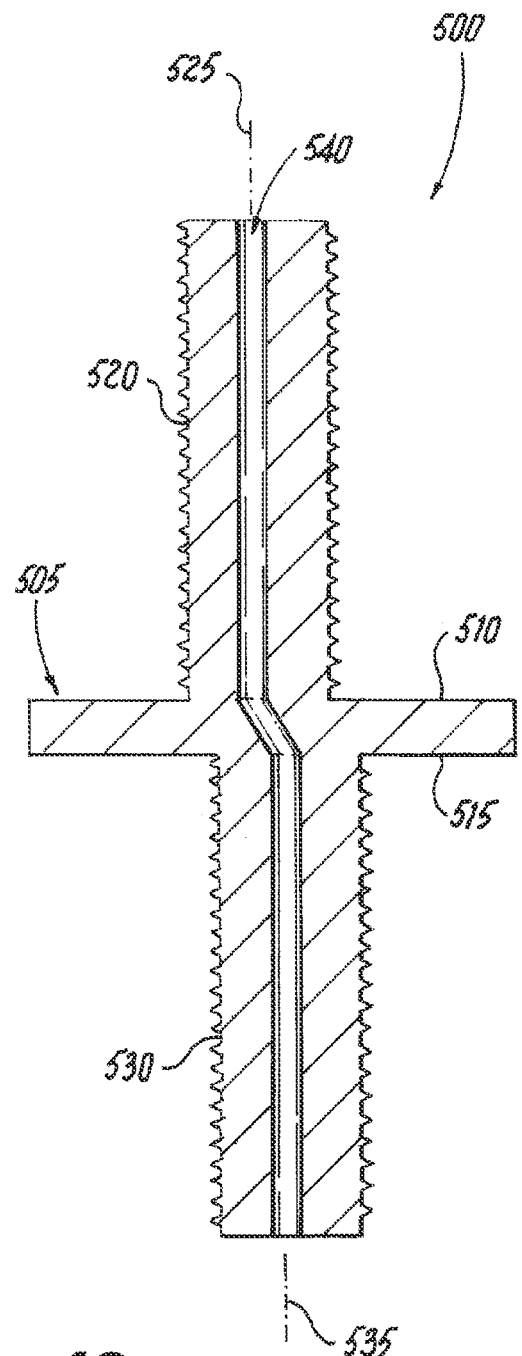

FIGS. 11 and 12 show a perspective view and a sectional view, respectively, of a fifth attachment device 500 in accordance with a fifth illustrative embodiment of the invention. The fifth attachment device 500 includes a flange 505 defining an upper surface 510 and a lower surface 515. An upper shaft 520 projects upward from the upper surface 510 and is centered about an upper longitudinal axis 525, while a lower shaft 530 projects downward from the lower surface 515 and is centered about a lower longitudinal axis 535. The upper shaft 520 vertically overlaps the lower shaft 530, but the upper longitudinal axis 525 is not collinear with the lower longitudinal axis 535.

The fifth attachment device 500 is like the fourth attachment device 400 in that the upper shaft 520 and the lower shaft 530 are cylindrical, externally threaded, and have the same diameter, but, in the fifth attachment device 500, a smooth-bored through-hole 540 passes through the upper shaft 520, the flange 505, and the lower shaft 530 such that the smooth-bored through-hole 540 is centered in both the upper shaft 520 and the lower shaft 530. To accomplish this, the smooth-bored through-hole 540 describes an angled path (i.e., a jog) inside the flange 505. That is, the smooth-bored through-hole 540 describes an angled path in the flange 505 that is not normal to the upper surface 510. The smooth-bored through-hole 540 can again be used for passing gases, fluids, or solids through the fifth attachment device 500. However, in the fifth attachment device 500, the smooth-bored through-hole 540 is centered in both the upper shaft 520 and the lower shaft 530, maintaining the strength and integrity of the fifth attachment device 500. The angled path in the flange 505 allows a smooth transition from the upper longitudinal axis 525 to the lower longitudinal axis 535. There is, as a result, less chance that wires and such will get hung up inside the flange 505.

It will be noted that any gases, fluids, or solids passing through the fifth attachment device 500 will emerge from the fifth attachment device 500 with a lateral offset equal to the lateral offset between the upper longitudinal axis 525 and the lower longitudinal axis 535. Accordingly, the fifth attachment device 500 becomes more than a means of attaching objects with a lateral offset. The fifth attachment device 500 may also be used to shift the pathways of gases, fluids, or solids passing therethrough. There are numerous applications where such a lateral shift may be desired.

Figure 13:
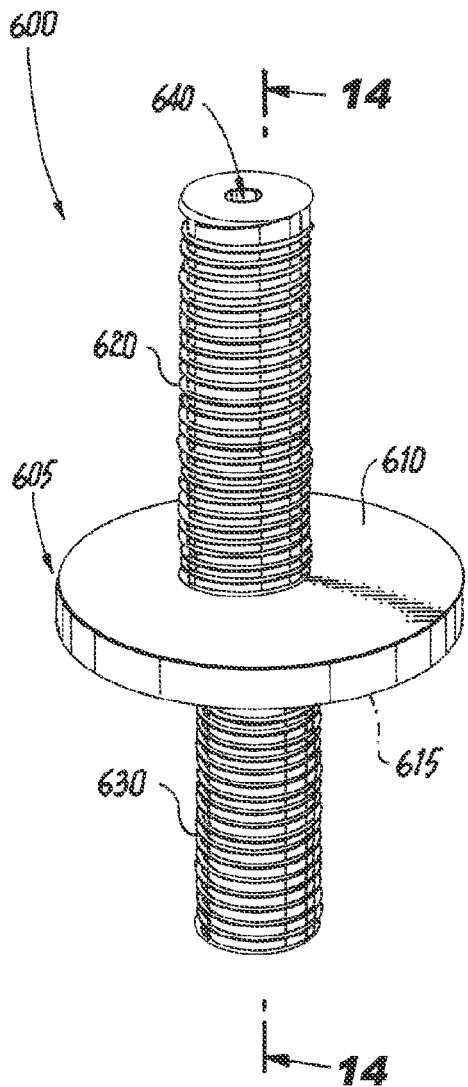
FIGS. 13 and 14 show a perspective view and a sectional view, respectively, of a sixth attachment device in accordance with a sixth illustrative embodiment of the invention.
Figure 14:
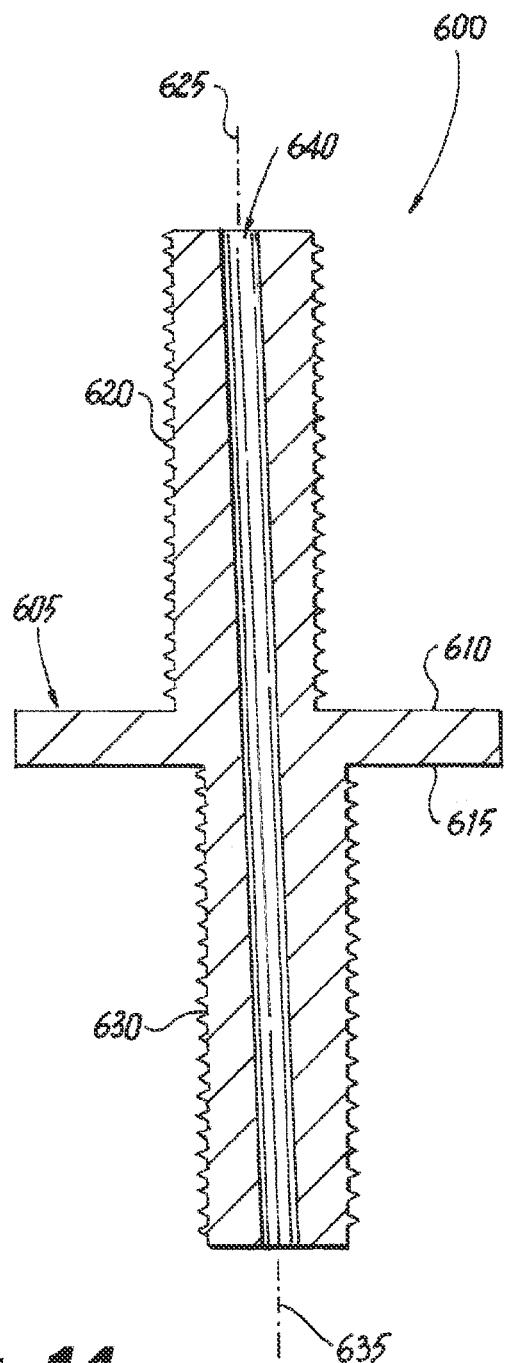

FIGS. 13 and 14 show a perspective view and a sectional view, respectively, of a sixth attachment device 600 in accordance with a sixth illustrative embodiment of the invention. The sixth attachment device 600 includes a flange 605 defining an upper surface 610 and a lower surface 615. An upper shaft 620 projects upward from the upper surface 610 and is centered about an upper longitudinal axis 625, while a lower shaft 630 projects downward from the lower surface 615 and is centered about a lower longitudinal axis 635. The upper shaft 620 vertically overlaps the lower shaft 630, but the upper longitudinal axis 625 is not collinear with the lower longitudinal axis 635.

The upper shaft 620 and the lower shaft 630 are cylindrical, externally threaded, and have the same diameter in the sixth attachment device 600. A smooth-bored through-hole 640 passes through the upper shaft 620, the flange 605, and the lower shaft 630. The smooth-bored through-hole 640 is linear along its entirety and makes an angled path through the upper shaft 620, the flange 605, and the lower shaft 630 so that the smooth-bored through-hole 640 exits the upper shaft 620 and the lower shaft 630 in approximately the center of the upper shaft 620 and the lower shaft 630, respectively. Stated another way, the smooth-bored through-hole 640 describes an angled path in the sixth attachment device 600 that is not normal to the upper surface 610. The smooth-bored through-hole 640 can again be used for passing gases, fluids, or solids through the sixth attachment device 600. The smooth-bored through-hole 640 is approximately centered in both the upper shaft 620 and the lower shaft 630, maintaining the strength and integrity of the sixth attachment device 600. The linear nature of the smooth-bored through-hole 640 even further reduces the chances that wires and such will get impeded inside the sixth attachment device 600.

FIGS. 15 and 16 show a perspective view and a sectional view, respectively, of a seventh attachment device 700 in accordance with a seventh illustrative embodiment of the invention. The seventh attachment device 700 includes a flange 705 defining an upper surface 710 and a lower surface 715. An upper shaft 720 projects upward from the upper surface 710 and is centered about an upper longitudinal axis 725, while a lower shaft 730 projects downward from the lower surface 715 and is centered about a lower longitudinal axis 735. The upper shaft 720 vertically overlaps the lower shaft 730, but the upper longitudinal axis 725 is not collinear with the lower longitudinal axis 735.

In the seventh attachment device 700, the upper shaft 720 and the lower shaft 730 are both cylindrical, externally threaded, and have the same diameter. A blind internally-threaded hole 740 is disposed in the top of the upper shaft 720 opposite the flange 705. The blind internally-threaded hole 740 acts as an alternative means of attaching an object to the seventh attachment device 700 using, for example, a threaded fastener. Advantageously, because the blind internally-threaded hole 740 only penetrates partially into the upper shaft 720, there is no pathway for water to penetrate through the seventh attachment device 700, as might be the case in, for example, the third attachment device 300.

Figure 17:
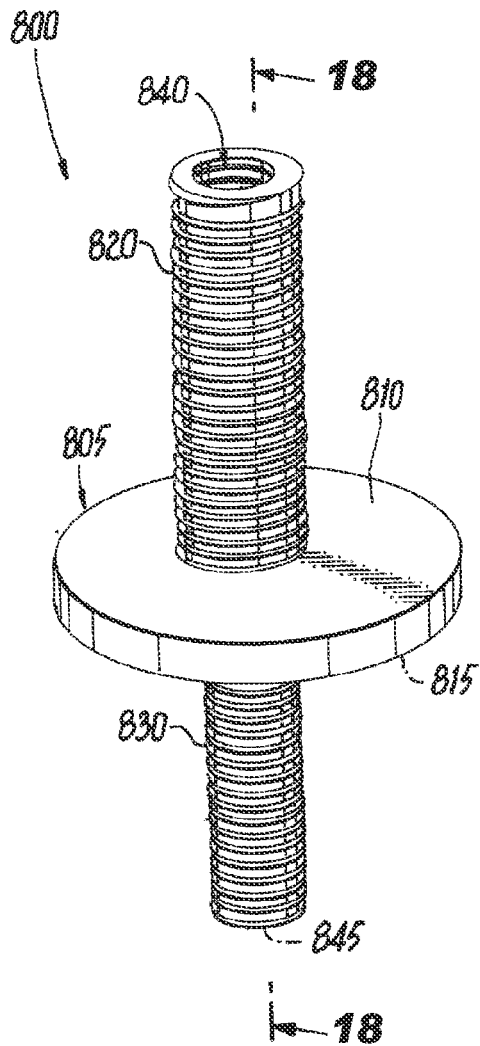
FIGS. 17 and 18 show a perspective view and a sectional view, respectively, of an eighth attachment device in accordance with an eighth illustrative embodiment of the invention.
Figure 18:
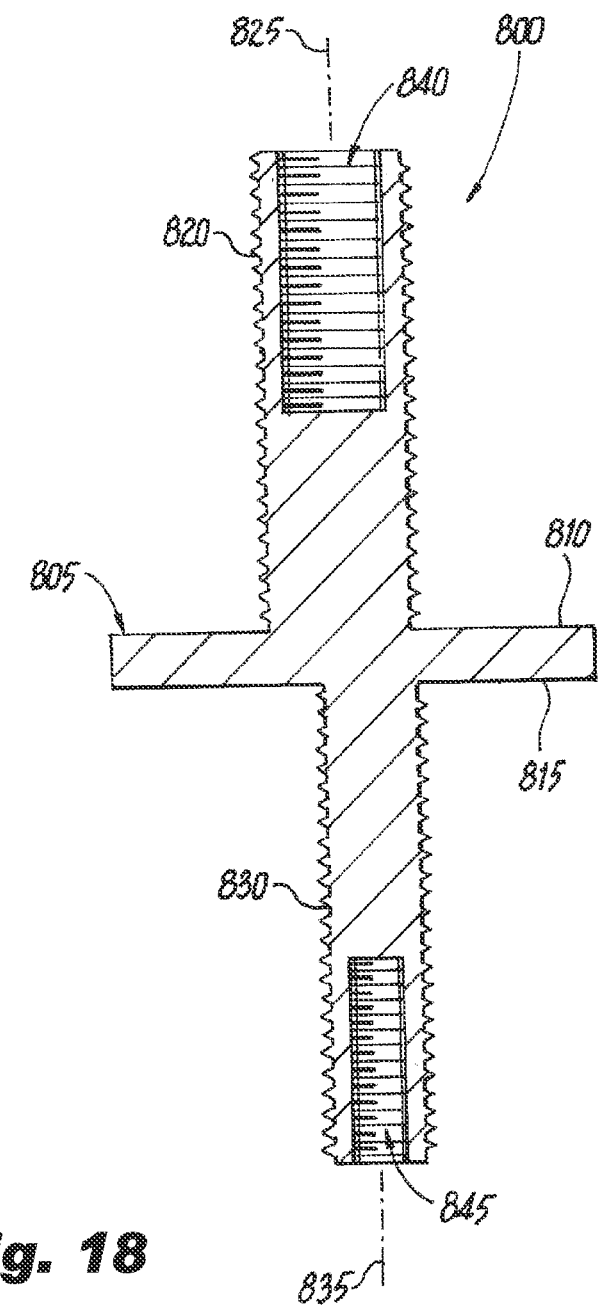

FIGS. 17 and 18 show a perspective view and a sectional view, respectively, of an eighth attachment device 800 in accordance with an eighth illustrative embodiment of the invention. The eighth attachment device 800 includes a flange 805 defining an upper surface 810 and a lower surface 815. An upper shaft 820 projects upward from the upper surface 810 and is centered about an upper longitudinal axis 825, while a lower shaft 830 projects downward from the lower surface 815 and is centered about a lower longitudinal axis 835. The upper shaft 820 vertically overlaps the lower shaft 830, but the upper longitudinal axis 825 is not collinear with the lower longitudinal axis 835.

The upper shaft 820 and the lower shaft 830 in the eighth attachment device 800 are cylindrical and externally threaded. However, in this illustrative embodiment, the upper shaft 820 and lower shaft 830 have different diameters, demonstrating generally that upper shafts and lower shafts in accordance with aspects of the invention need not have the same diameter. Like the seventh attachment device 700, the eighth attachment device 800 includes an upper internally-threaded blind hole 840 in the top of the upper shaft 820 opposite to the flange 805. Moreover, the eighth attachment device 800 includes a lower internally-threaded blind hole 845 in the bottom of the lower shaft 830 opposite to the flange 805. Both the upper internally-threaded blind hole 840 and the lower internally-threaded blind hole 845 become alternative means of attaching objects to the eighth attachment device 800. Because both the upper internally-threaded blind hole 840 and the lower internally-threaded blind hole 845 are blind, the chance of water penetration through the eighth attachment device 800 is eliminated, as was the case for the seventh attachment device 700.

Figure 19:
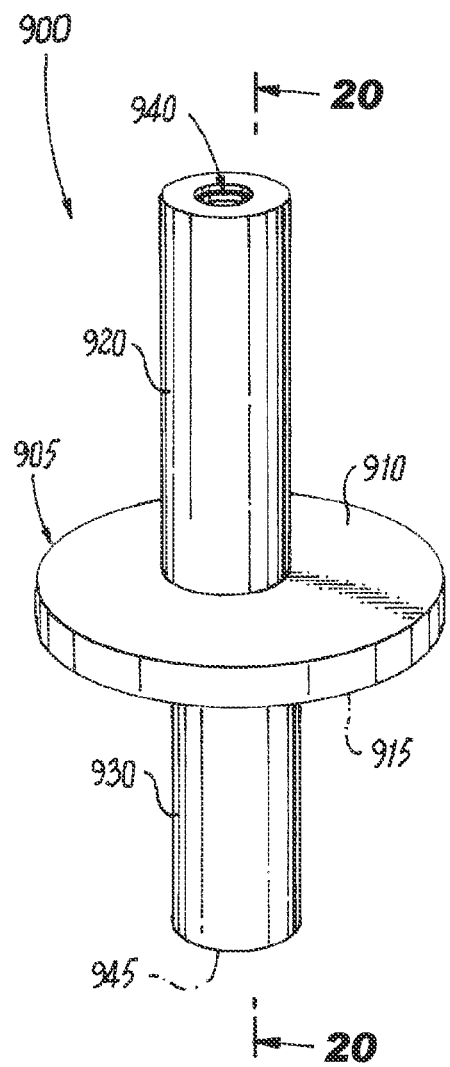
FIGS. 19 and 20 show a perspective view and a sectional view, respectively, of a ninth attachment device in accordance with a ninth illustrative embodiment of the invention.
Figure 20:
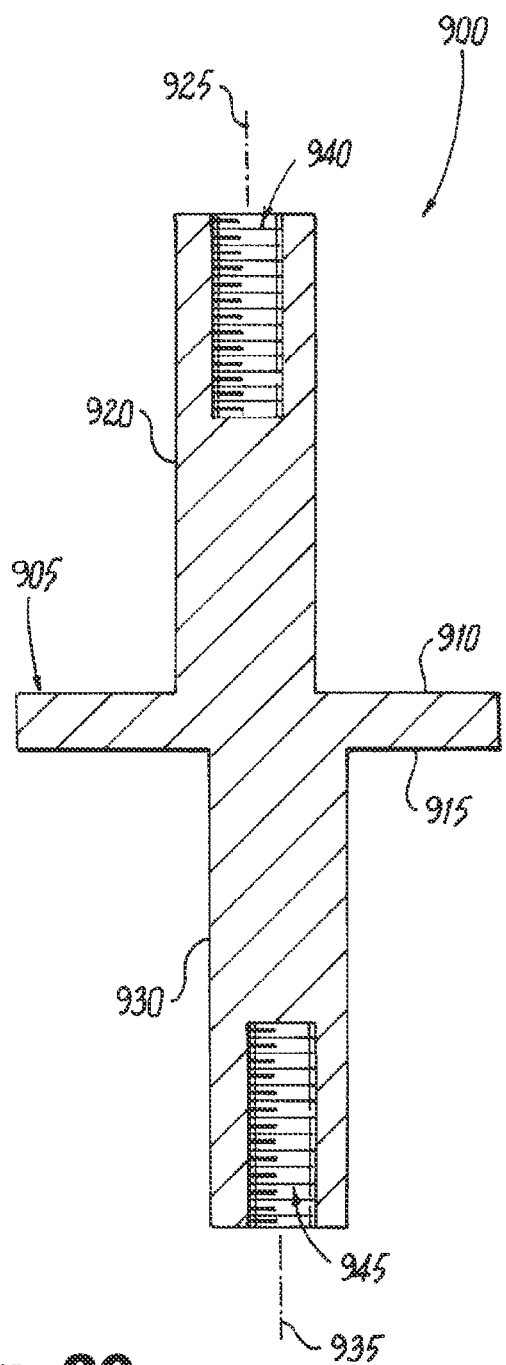

FIGS. 19 and 20 show a perspective view and a sectional view, respectively, of a ninth attachment device 900 in accordance with a ninth illustrative embodiment of the invention. The ninth attachment device 900 includes a flange 905 defining an upper surface 910 and a lower surface 915. An upper shaft 920 projects upward from the upper surface 910 and is centered about an upper longitudinal axis 925, while a lower shaft 930 projects downward from the lower surface 915 and is centered about a lower longitudinal axis 935. The upper shaft 920 vertically overlaps the lower shaft 930, but the upper longitudinal axis 925 is not collinear with the lower longitudinal axis 935.

The upper shaft 920 and the lower shaft 930 in the ninth attachment device 900 are cylindrical and have the same diameter. They also include an upper internally-threaded blind hole 940 and a lower internally-threaded blind hole 945 in the manner of the eighth attachment device 800. However, the ninth attachment device 900 demonstrates generally that the upper shaft 920 and the lower shaft 930 need not be externally threaded but may have unthreaded lateral surfaces if so desired. Such smooth unthreaded shafts may accommodate the attachment of hoses to the ninth attachment device 900 via, for example, conventional hose clamps.

Figure 21:
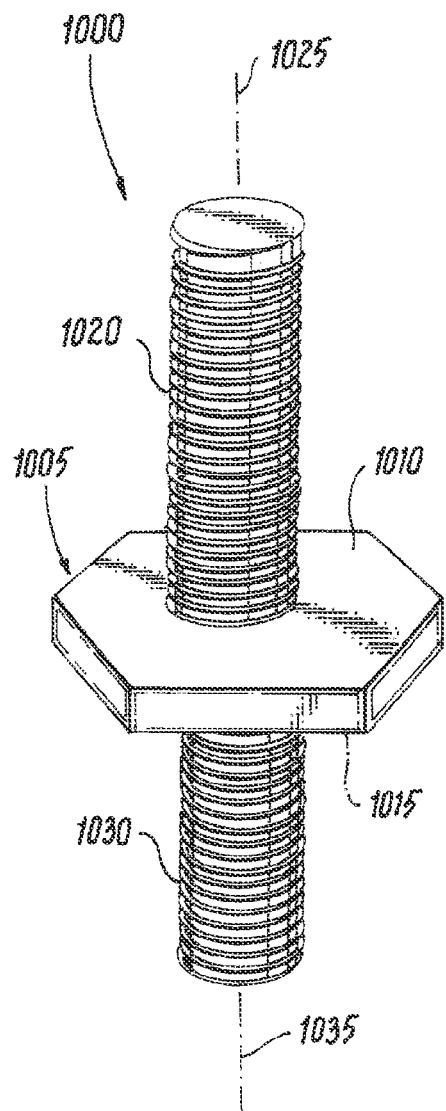
FIG. 21 shows a perspective view of a tenth attachment device in accordance with a tenth illustrative embodiment of the invention.

While the flanges in the attachment devices set forth above are circular, they may take on different shapes in alternative embodiments. They may, for example, be square, rectangular, ovoid, or polygonal. FIG. 21 shows a perspective view of a tenth attachment device 1000 in accordance with a tenth illustrative embodiment of the invention. The tenth attachment device 1000 includes a flange 1005 defining an upper surface 1010 and a lower surface 1015. An upper shaft 1020 projects upward from the upper surface 1010 and is centered about an upper longitudinal axis 1025, while a lower shaft 1030 projects downward from the lower surface 1015 and is centered about a lower longitudinal axis 1035. The upper shaft 1020 vertically overlaps the lower shaft 1030, but the upper longitudinal axis 1025 is not collinear with the lower longitudinal axis 1035. The flange 1005 is hexagonal, allowing use of a tool such as a wrench to gain purchase on the tenth attachment device 1000 during installation.

Figure 22:
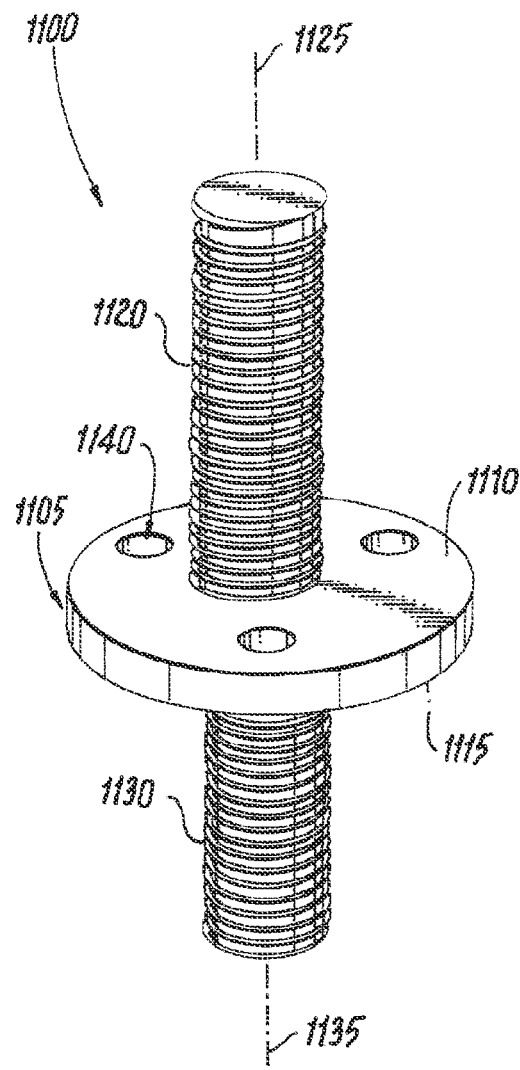
FIG. 22 shows a perspective view of an eleventh attachment device in accordance with an eleventh illustrative embodiment of the invention.

In addition, auxiliary holes may be added to the flange of one or more of the above-described embodiments to obtain a means of attaching the flange itself to an object by, for example, threaded fasteners such as bolts or screws. FIG. 22 shows a perspective view of an eleventh attachment device 1100 in accordance with an eleventh illustrative embodiment of the invention. The eleventh attachment device 1100 is similar to the second attachment device 200. The eleventh attachment device 1100 includes a flange 1105 defining an upper surface 1110 and a lower surface 1115. An upper shaft 1120 projects upward from the upper surface 1110 and is centered about an upper longitudinal axis 1125, while a lower shaft 1130 projects downward from the lower surface 1115 and is centered about a lower longitudinal axis 1135. The upper shaft 1120 vertically overlaps the lower shaft 1130, but the upper longitudinal axis 1125 is not collinear with the lower longitudinal axis 1135. The flange 1105 defines three auxiliary holes 1140 that pass therethrough. In the present illustrative embodiment, the three auxiliary holes 1140 are smooth bored, but in, alternative embodiments, they may be internally threaded.

As indicated above, attachment devices in accordance with aspects of the invention allow one to introduce a lateral offset between an object attached to the upper shaft and an object attached to the lower shaft. The desired orientation of this lateral offset between the objects is usually determined by the particular application. Nevertheless, when fixating an attachment device in accordance with aspects of the invention having externally-threaded upper and lower shafts (such as the first attachment device 100) to an object with an internally threaded hole, the externally threaded shaft of the attachment device may tighten against the internal threads of the object at a point that does not yield the desired lateral-offset orientation. In fact, without careful engineering of the shaft and the hole, it is improbable that one would obtain the desired lateral-offset orientation by mere chance.

One solution to this issue is to add washers to one or both of the upper shaft and the lower shaft to act as standoffs before screwing the upper shaft or the lower shaft into an object. By use of the appropriate thickness of these washers, the attachment device will be tightened against the object with the lateral offset having the desired orientation. Referring back to the exemplary application in FIG. 3, for example, one may set the lateral-offset orientation of the first attachment device 100 by placing one or more washers between the first attachment device 100 and the insert 30. Nevertheless, addition of washers in this manner may require some trial and error. Accordingly, another means of providing the desired standoff distance is desirable where the orientation of the lateral offset is critical.

Figure 23:
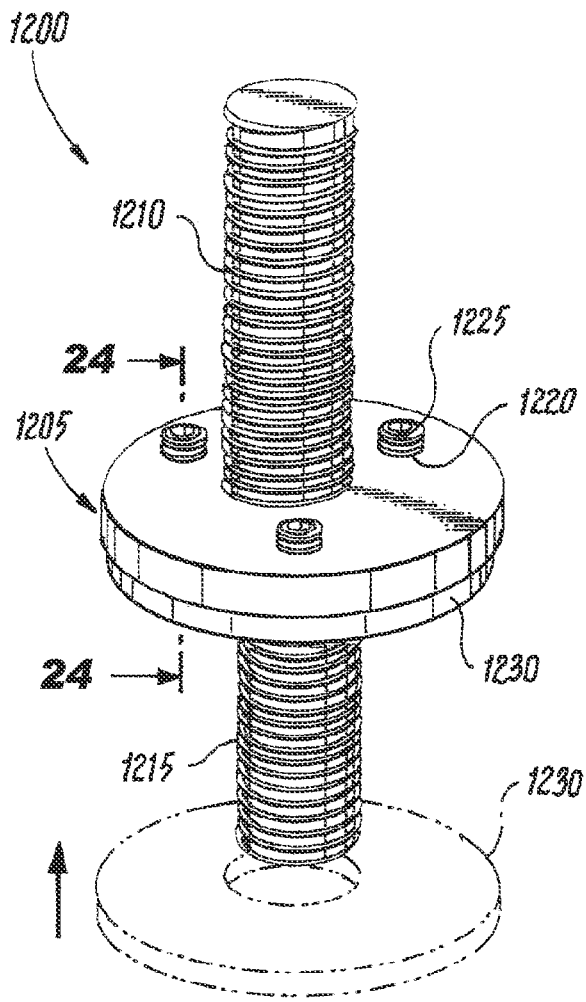
FIGS. 23 and 24 show a perspective view and a sectional view, respectively, of a twelfth attachment device in accordance with a twelfth illustrative embodiment of the invention.
Figure 24:
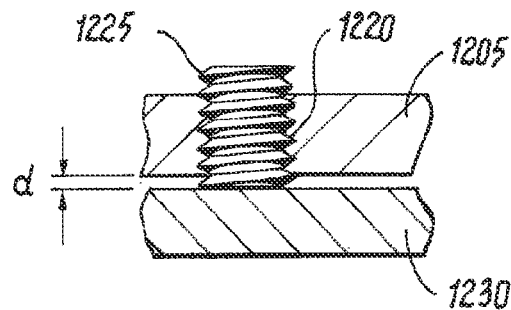

FIGS. 23 and 24 show aspects of a twelfth attachment device 1200 in accordance with a twelfth illustrative embodiment of the invention that includes an optional adjustable standoff assembly that can be easily adjusted to create the desired standoff between the twelfth attachment device 1200 and an object being fixated. FIG. 23 shows a perspective view of the twelfth attachment device 1200, while FIG. 24 shows a sectional view along the cleave plane indicated in FIG. 21.

The twelfth attachment device 1200 includes a flange 1205 from which projects an upper shaft 1210 and a lower shaft 1215 in the manner of the first attachment device 100. However, the flange 1205 in the twelfth attachment device 1200 includes three threaded holes 1220 in which set screws 1225 are engaged. A washer 1230 encircles the lower shaft 1215 and is disposed below the flange 1205.

While in use, the set screws 1225 protrude below the flange 1205 towards the washer 1230 and act to determine the distance d between the flange 1205 and the washer 1230. That is, the distance d between the flange 1205 and the washer 1230 is determined by an extent by which the set screws 1225 protrude from the flange 1205 towards the washer 1230. If the distance 1235 is not that desired, the set screws 1225 may be rotated one way or the other to create greater or lesser distance d between the flange 1205 and the washer 1230. Ultimately, the distance 1235 can be tailored so that an object threadably engaged with the lower shaft 1215 tightens to the lower shaft 1215 at precisely the point where the orientation of the lateral offset falls as desired. The twelfth attachment device 1200 thereby provides an easy-to-use solution for placing the lateral offset into the desired orientation.

The characteristics of the many embodiments set forth above may be mixed and matched to form other embodiments falling within the scope of the invention. For example, an attachment device falling within the scope of the invention may contain an upper shaft that is externally threaded in the manner of the first attachment device 100 in combination with a lower shaft that defines an unthreaded lateral surface in the manner of the ninth attachment device 900. Another attachment device falling within the scope of the invention may have upper and lower shafts that are cylindrical, externally threaded, and solid (i.e., devoid of sockets, slots, through-holes, and blind holes) in the manner of the second attachment device 200 but have an upper shaft that differs in diameter from its lower shaft in the manner of the eighth attachment device 800. Even another attachment device in accordance with aspects of the invention may have an upper shaft with a socket in the manner of the first attachment device 100, and a lower shaft with a blind internally-threaded hole in the manner of the eighth attachment device 800. These many possible iterations and others will be apparent to one skilled in the art.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus comprising:
a flange defining an upper surface and a lower surface;
an upper shaft projecting from the upper surface, centered about an upper longitudinal axis, and being cylindrical for its entire length with an exposed end face; and
a lower shaft projecting from the lower surface, centered about a lower longitudinal axis, and being cylindrical for its entire length with an exposed end face;
wherein the upper longitudinal axis is not collinear with the lower longitudinal axis.

2. The apparatus of claim 1, wherein, with the upper shaft and the lower shaft oriented in a vertical direction, at least a portion of the upper shaft is vertically directly above a portion of the lower shaft.

3. The apparatus of claim 1, wherein the upper shaft is cylindrical.

4. The apparatus of claim 1, wherein the upper shaft is externally threaded.

5. The apparatus of claim 1, wherein the upper shaft describes an unthreaded lateral surface.

6. The apparatus of claim 1, wherein the flange is circular.

7. The apparatus of claim 1, wherein the flange is polygonal.

8. An apparatus comprising:
a flange defining an upper surface and a lower surface;
an upper shaft projecting from the upper surface and centered about an upper longitudinal axis;

a lower shaft projecting from the lower surface and centered about a lower longitudinal axis, the lower longitudinal axis not collinear with the upper longitudinal axis; and a through-hole passing through the upper shaft, the flange, and the lower shaft.

9. The apparatus of claim 8, wherein the through-hole is at least partially smooth bored.

10. The apparatus of claim 8, wherein the through-hole is at least partially internally threaded.

11. The apparatus of claim 8, wherein the through-hole is linear along its entirety.

12. The apparatus of claim 8, wherein the through-hole is centered in the upper shaft and off-center in the lower shaft.

13. The apparatus of claim 8, wherein the through-hole describes an angled path in the flange that is not normal to the upper surface.

14. The apparatus of claim 8, wherein the through-hole is linear along its entirety and describes an angled path in the upper shaft, the flange, and the lower shaft that is not normal to the upper surface.

15. The apparatus of claim 1, wherein the upper shaft and the lower shaft have different diameters.

16. The apparatus of claim 1, further comprising a blind internally-threaded hole in the upper shaft.

17. The apparatus of claim 1, further comprising a socket or a slot in an end of the upper shaft opposite the flange.

18. The apparatus of claim 17, wherein the socket or the slot is off-center in the end of the upper shaft opposite the flange.

19. The apparatus of claim 1, further comprising a plurality of auxiliary holes passing through the flange.

20. An apparatus comprising:

a flange defining an upper surface and a lower surface;

an upper shaft projecting from the upper surface and centered about an upper longitudinal axis;

a lower shaft projecting from the lower surface and centered about a lower longitudinal axis;

a plurality of auxiliary holes passing through the flange;

a plurality of screws; and a washer encircling the lower shaft;

wherein:

the upper longitudinal axis is not collinear with the lower longitudinal axis;

each of the plurality of auxiliary holes is at least partially internally threaded;

each of the plurality of screws threadably engages a respective one of the plurality of auxiliary holes;

the washer abuts the plurality of screws; and a distance between the flange and the washer is determined by an extent by which the plurality of screws protrude from the flange towards the washer.

21. The apparatus of claim 1, further comprising:

a first object attached to the upper shaft; and a second object attached to the lower shaft;

wherein:

the upper shaft passes through or into the first object; and the lower shaft passes through or into the second object.

* * * * *